United States Patent
Park et al.

(10) Patent No.: US 9,924,375 B1
(45) Date of Patent: Mar. 20, 2018

(54) METHOD AND SYSTEM FOR SHARING REMOTE RADIO HEAD BETWEEN CELL SITES

(71) Applicant: Sprint Spectrum L.P., Overland Park, KS (US)

(72) Inventors: Sungki Park, Ashburn, VA (US); Brent A. Scott, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 252 days.

(21) Appl. No.: 14/930,211

(22) Filed: Nov. 2, 2015

(51) Int. Cl.
| | |
|---|---|
| *H04B 7/00* | (2006.01) |
| *H04W 16/00* | (2009.01) |
| *H04W 16/24* | (2009.01) |
| *H04B 7/022* | (2017.01) |
| *H04B 7/0408* | (2017.01) |

(52) U.S. Cl.
CPC ............ *H04W 16/24* (2013.01); *H04B 7/022* (2013.01); *H04B 7/0408* (2013.01)

(58) Field of Classification Search
CPC ...... H04B 7/024; H04B 7/022; H04B 7/0408; H04L 5/00; H04W 16/24
See application file for complete search history.

(56) References Cited

U.S. PATENT DOCUMENTS

2017/0013630 A1* 1/2017 Franz .................... H04L 5/00
2017/0033842 A1* 2/2017 Lu ....................... H04B 7/024

* cited by examiner

*Primary Examiner* — Gbemileke J Onamuti

(57) ABSTRACT

Disclosed is a method and system for sharing a remote radio head (RRH) between multiple cell sites. An RRH is be coupled with at least two separately located cell sites, so as to interface concurrently between one such cell site and a baseband unit and between the other such cell site and the baseband unit. Further, a baseband unit may thus also serve the multiple cell sites, by being coupled with the RRH that serves the multiple cell sites.

20 Claims, 7 Drawing Sheets

METHOD AND SYSTEM FOR SHARING REMOTE RADIO HEAD BETWEEN CELL SITES

BACKGROUND

Unless otherwise indicated herein, the description provided in this section is not itself prior art to the claims and is not admitted to be prior art by inclusion in this section.

A typical wireless communication system includes a plurality of cell sites, each configured to provide one or more respective wireless coverage areas such as a cell or cell sectors in which to serve wireless communication devices (WCD) such as cell phones or wirelessly equipped computers. In practice, each cell site may include a respective antenna configuration, as well as respective supporting cell site equipment, which may be coupled in turn with network infrastructure such as routers, switches, gateways, and the like.

With this arrangement, when the supporting cell site equipment receives from the network infrastructure data that is to be transmitted in a wireless coverage area, or the supporting cell site equipment itself generates such data for transmission, the supporting equipment may convert the data into a form suitable for transmission by the antenna configuration, and the antenna configuration may then output the data over the air in the wireless coverage area. For instance, the supporting equipment may encode the data and modulate the encoded data on a radio frequency (RF) carrier, the supporting equipment may then pass the modulated carrier to the antenna configuration for RF transmission, and the antenna configuration may then wirelessly output the modulated carrier.

Likewise, when the antenna configuration wirelessly receives from within such a coverage area a modulated RF carrier representing data, the antenna configuration may pass that modulated RF carrier to the supporting cell site equipment, and the supporting equipment may then process that communication to uncover the underlying data. For instance, the supporting equipment may demodulate the RF carrier to uncover encoded data and may then decode the encoded data to uncover the underlying data. The supporting equipment may then handle the data locally or pass the data along to the network infrastructure for handling, as appropriate.

OVERVIEW

In a representative wireless communication system, the antenna configuration of each cell site may be arranged to provide a number of discrete but partly overlapping sectors as separately defined wireless coverage areas, such as three sectors for instance. To facilitate this, the antenna configuration may include for each sector a number of antennas, such as dipole antennas or antenna array elements, in a configuration that functions to provide a separate radiation pattern per sector. For instance, the antenna configuration of a cell site could be configured to provide roughly omnidirectional coverage by radiating to define three 120-degree sectors. Further, the antenna configuration for each sector could be arranged to support multiple input/multiple output (MIMO) service by applying multiple antennas or antenna elements. For instance, a sector could provide "8T8R MIMO" by having eight antennas each functioning to transmit and receive, "4T4R" MIMO by having four antennas each functioning to transmit and receive, or "2T2R" MIMO by having two antennas each functioning to transmit and receive.

In addition, each cell site may be configured to provide coverage on a number of carriers. Each such carrier could be defined by government regulation to span a particular range of frequency in the RF spectrum. For example, carriers might span 5 MHz, 10 MHz, or 15 MHz, around a center frequency in a defined band, such as the 800 MHz band, the 1.9 GHz band, or the 2.5 GHz band. Each such carrier could be a frequency division duplex (FDD) carrier in which separate ranges of frequency are used for downlink communication from the cell site to WCDs and for uplink communication from WCDs to the cell site, or a time division duplex (TDD) carrier in which a common range of frequency is multiplexed over time for downlink and uplink use.

In a typical arrangement, each of a cell site's carriers may be used in each of the cell site's sectors, so as to define effectively a multiple of discrete wireless coverage areas, each being within a given sector and being on a given carrier. For instance, if the cell site antenna configuration is arranged to provide three discrete sectors and the cell site operates on three carriers, the cell site may effectively provide nine separate coverage areas, three on each carrier. Of course, variations from this arrangement may be possible as well. For instance, a cell site could be arranged with its sectors having different carrier allocations.

The supporting equipment of a cell site may include equipment that enables the cell site to communicate discretely in each of its wireless coverage areas, so as to facilitate separate operation of each wireless coverage area. To facilitate this, the supporting equipment of a cell site may include a baseband digital unit and one or more remote radio heads (RRHs), with the baseband unit being configured to encode/decode data on a per coverage area basis, and each RRH being configured to modulate/demodulate encoded data on a per coverage area basis and including a power amplifier to amplify output transmissions per coverage area.

In practice, a cell site's baseband unit may be coupled with the network infrastructure and may take the form of a shelf unit holding one or more channel cards, one channel card for each carrier on which the cell site is configured to operate, with each channel card including logic modules (e.g., circuitry and/or one or more programmed processing units) to separately provide baseband unit functionality such as encoding/decoding for each sector of the cell site. Thus, if the cell site is to provide service on two carriers and has three sectors, then the baseband unit may include two channel cards, with each channel card having modules for separately serving the three sectors of the cell site. In an example cell arrangement, the baseband unit would be situated at the base of an antenna tower, if a tower is provided.

Each RRH may then be situated near the antenna configuration, such as at a tower top, and may be coupled by a multi-fiber cable with the channel card(s) of the baseband unit. Further the RRH may include a number of antenna ports (e.g., mini-DIN ports) for coupling the RRH by an RF-transmission medium such as one or more coaxial cables with cell site antennas. And the RRH may include logic (e.g., circuitry and/or one or more programmed processing units) to provide RRH functionality such as modulation/demodulation and power amplification for the cell site, interfacing between the cell site's baseband unit and the cell site's antennas.

With this arrangement, in practice, when the cell site's baseband unit receives or generates data to be transmitted by the antennas of a given wireless coverage area of the cell site (e.g., a given sector on a given carrier), the baseband unit may apply its logic to encode the data, such as by applying constellation coding or the like to produce code symbols (e.g., I and Q symbols) representing the data, and the baseband unit may then pass the resulting symbols to an RRH that is serving the wireless coverage area. The RRH may then modulate the symbols onto an RF carrier and transmit the RF carrier to the wireless coverage area's antennas for wireless transmission in the coverage area. Likewise, when the wireless coverage area's antennas receive a modulated RF carrier from within the coverage area, the RRH that serves that coverage area may receive and demodulate the carrier to uncover code symbols and may pass those code symbols to the baseband unit, and the baseband unit may then decode the symbols to uncover the underlying data.

In a representative implementation, each RRH may include a plurality of antenna ports and may be configurable in various arrangements for coupling with the antennas of the cell site's sectors. For instance, and without limitation, an RRH may include eight antenna ports, and the RRH may be configurable to use those for serving one or more of the cell site's sectors, with the RRH's logic then functioning to interface accordingly between the connected sector(s) and the baseband unit's channel card(s).

For example, an eight-port RRH could serve a single eight-antenna sector, with all of the RRH ports being coupled with the antennas of that one sector, in which case three RRHs would be needed to serve all of the sectors of a three-sector cell site. As another example, an eight-port RRH could be logically split into four two-port units and could serve three two-antenna sectors, with two RRH ports being coupled with each sector's antennas, in which case one RRH would be needed to serve a three-sector cell site, leaving two ports of the RRH unused (e.g., connected with a dummy load). And as yet another example, each of two eight-port RRHs could each be logically split into two four-port units and could serve three four-antenna sectors, with four ports of one of the RRHs being left unused (e.g., connected with a dummy load).

As can be seen by just these examples, certain RRH arrangements may result in some of the RRH ports being unused. In practice, this may be a waste of RRH resources. Further, this issue could be magnified in a wireless communication system that includes multiple cell sites that have some unused RRH resources like this.

Disclosed herein is a method and system to help more efficiently make use of RRH resources, by sharing an RRH between multiple separate cell sites. In accordance with the disclosure, an RRH would be coupled with at least two separately located cell sites, so as to interface concurrently between one such cell site and a baseband unit and between the other such cell site and the baseband unit. A baseband unit may thus also serve the multiple cell sites, by being coupled with the RRH that serves the multiple cell sites. Alternatively, in theory, still separate baseband units could be provided for each cell site, in which case multiple baseband units would be coupled with the shared RRH, and the shared RRH would in turn be coupled with the multiple cell sites.

With this configuration, the RRH may still provide RRH functionality for multiple sectors as though the sectors were part of a single cell site, but at least two of the sectors could be at entirely different cell sites. Advantageously, this configuration can help make more full use of the RRH's resources, possibly resulting in reduced cost, conservation of space, and other benefits.

Accordingly, in one respect, disclosed is a wireless communication system with a shared radio-head. The wireless communication system includes at least two cell sites located at different positions than each other, each cell site including respectively one or more antennas configured to provide at least one respective wireless coverage area, with a first cell site including one or more first site antennas configured to provide at least a first wireless coverage area, and a second cell site including one or more second site antennas configured to provide at least a second wireless coverage area. Further, the wireless communication system includes an RRH arranged to serve at least the two cell sites concurrently, with the RRH including at least one baseband port for coupling with at least one baseband unit and including multiple antenna ports for coupling with (a) at least one of the one or more first site antennas and (b) at least one of the one or more second site antennas. With this arrangement, the RRH would thus concurrently interface (i) between the at least one baseband unit and the at least one of the one or more first site antennas and (ii) between the at least one baseband unit and the at least one of the one or more second site antennas.

In another respect, disclosed is a method for sharing an RRH between two or separately located cell sites including a first cell site and a separately located second cell site. In line with the discussion above, the RRH may include at least one baseband port for coupling the RRH with at least one baseband unit, and multiple antenna ports for coupling the RRH with cell site antennas. Further, the RRH may be configured to receive downlink communications from the at least one baseband unit, modulate the received downlink communications to produce modulated downlink communications, and pass the modulated downlink communications to cell site antennas for wireless transmission, and to receive modulated uplink communications from cell site antennas, demodulate the received modulated uplink communications to produce demodulated uplink communications, and pass the demodulated uplink communications to the at least one baseband unit for processing.

Per the disclosure, the method includes connecting the at least one baseband port of the RRH with the at least one baseband unit. Further, the method includes connecting a first proper subset of the antenna ports of the RRH with one or more cell site antennas of the first cell site, and connecting a second proper subset of the antenna ports of the RRH with one or more cell site antennas of the second cell site, the first and second proper subsets being mutually exclusive. And the method includes operating the RRH to concurrently (i) interface between the at least one baseband unit and the one or more cell site antennas of the first cell site and (ii) interface between the at least one baseband unit and the one or more cell site antennas of the second cell site.

Still further, disclosed is an RRH configuration for concurrently serving two separately located cell sites, including a first cell site and a separately located second cell site. In line with the discussion above, the RRH configuration includes an RRH that has at least one baseband port for coupling with at least one baseband unit, and a plurality of antenna ports for coupling directly or indirectly with cell site antennas. Further, the RRH is configured to (i) receive downlink communications from the at least one baseband unit, modulate the received downlink communications to produce modulated downlink communications, and pass the modulated downlink communications to cell site antennas for wireless transmission, and (ii) receive modulated uplink communications from cell site antennas, demodulate the received modulated uplink communications to produce demodulated uplink communications, and pass the demodulated uplink communications to the at least one baseband unit for processing.

In the disclosed RRH configuration, the at least one baseband port of the RRH is coupled with the at least one baseband unit, a first proper subset of the antenna ports of the RRH is coupled with one or more cell site antennas of the first cell site, and a second proper subset of the antenna ports of the RRH is coupled with one or more cell site antennas of the second cell site, the first and second proper subsets being mutually exclusive. Further, the RRH is configured (e.g., through hardware and/or software settings to concurrently (i) interface between the at least one baseband unit and the one or more cell site antennas of the first cell site and (ii) interface between the at least one baseband unit and the one or more cell site antennas of the second cell site.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only and that numerous variations are possible.

DETAILED DESCRIPTION

Figure 1:
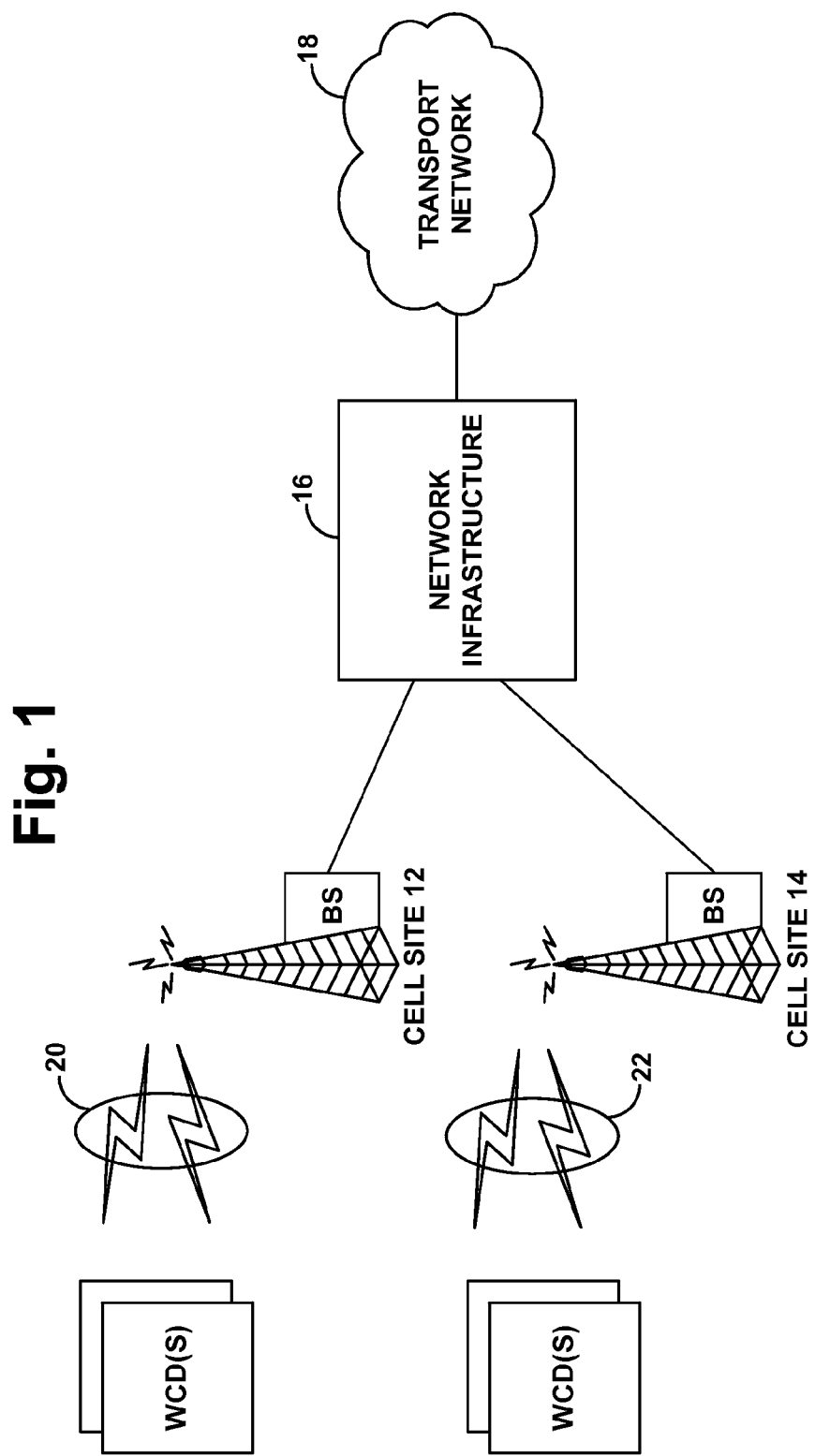
FIG. 1 is a simplified block diagram or an example wireless communication system including two representative cell sites.

Referring to the drawings, as noted above, FIG. 1 is a simplified block of an example wireless communication system including two representative cell sites 12, 14. In this example arrangement, the two cell sites 12, 14 are shown as being base station antenna towers with respective supporting cell site equipment shown as a box labeled "BS". In practice, though, a cell site does not need to have an antenna tower but could take some other form. For instance, the antenna configuration of a cell site could be mounted on a building or other structure, or the cell site could be provided in a smaller, integrated form as a small-cell, femtocell, or the like. Other examples are possible as well. Further, note that features of the present disclosure can apply with more than just two cell sites; for instance, an RRH can be shared in theory among three or more cell sites as well.

As further shown, both example cell sites 12, 14 are coupled with network infrastructure 16 (e.g., including routers, gateways, switches, servers, etc.), which may provide connectivity with a transport network 18, such as the Internet for instance. In addition, each cell site is configured to provide one or more respective wireless coverage areas, such as sectors on particular carriers, in which to serve WCDs. In particular, cell site 12 is shown providing one or more wireless coverage areas 20 in which to serve WCDs, and cell site 14 is shown providing one or more wireless coverage areas 22 in which to serve WCDs.

In practice, these cell sites may be arranged to provide wireless communication service in accordance with a defined air interface protocol, examples of which include, without limitation, Orthogonal Frequency Division Multiple Access (OFDMA) (e.g., Long Term Evolution (LTE), or Wireless Interoperability for Microwave Access (WiMAX)), Code Division Multiple Access (CDMA), Global System for Mobile Communication (GSM), or various wireless local area network protocols, such as IEEE 802.11 (WiFi), BLUETOOTH, or the like. The WCDs operating in coverage of such a cell site may then be configured to communicate according to the same air interface protocol.

As shown, the two example cell sites 12, 14 are separately located. That is, the cell sites are at different physical locations than each other. At a minimum, this may mean that the antenna configuration of each cell site is at a different physical location that the antenna configuration of the other cell site, even if a wireless coverage areas of one cell site may overlap in part with a wireless coverage area of the other cell site. By way of example, this arrangement could be provided on a campus or stadium, with cell sites established at various key locations throughout the campus or stadium in an effort to provide seamless wireless coverage. Considering a sports stadium for instance, cell sites could be set up at key locations in the perimeter of the stadium and in a parking area of the stadium.

Figure 2:
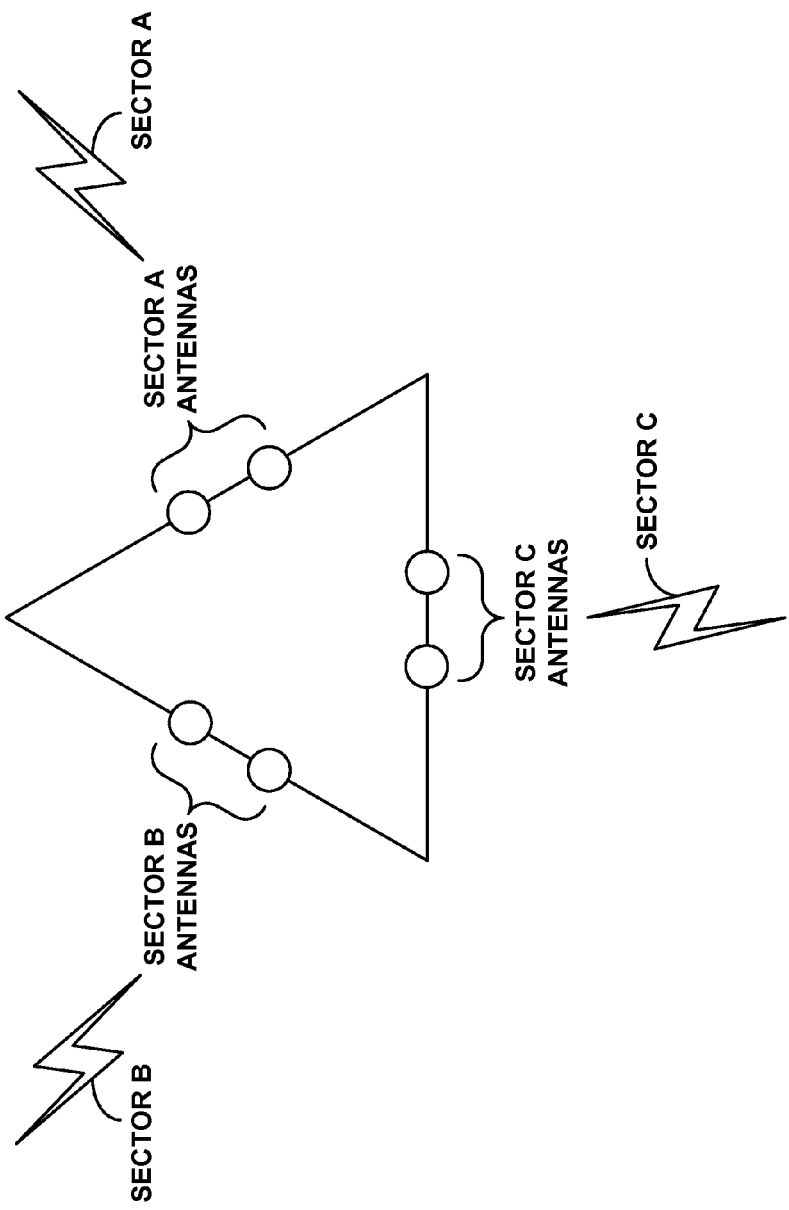
FIG. 2 is a simplified top view depiction of a representative cell site antenna configuration.

FIG. 2 is next a simplified top view depiction of a representative cell site antenna configuration, for an example three-sector cell site where each sector comprises two antennas to facilitate 2T2R operation for instance. As shown in FIG. 2, the cell site antenna configuration is arranged to provide three sectors, A, B, and C. To facilitate this, the antenna configuration includes separately for each sector two respective antennas, such as dipole antennas for instance. Thus, as shown, the antenna configuration includes (i) two sector A antennas configured to provide an RF radiation pattern defining sector A, (ii) two sector B antennas configured to provide an RF radiation pattern defining sector B, (iii) two sector B antennas configured to provide an RF radiation pattern. In an alternative configuration, a different number of antennas could be provided per sector, or the antennas could be configured in another way.

As a general matter, the antennas of a given cell site such as this can be considered cell site antennas, or site antennas. Thus, antennas of cell site 12 could be considered site-12 antennas, and antennas of cell site 14 could be considered site-14 antennas.

Figure 3:
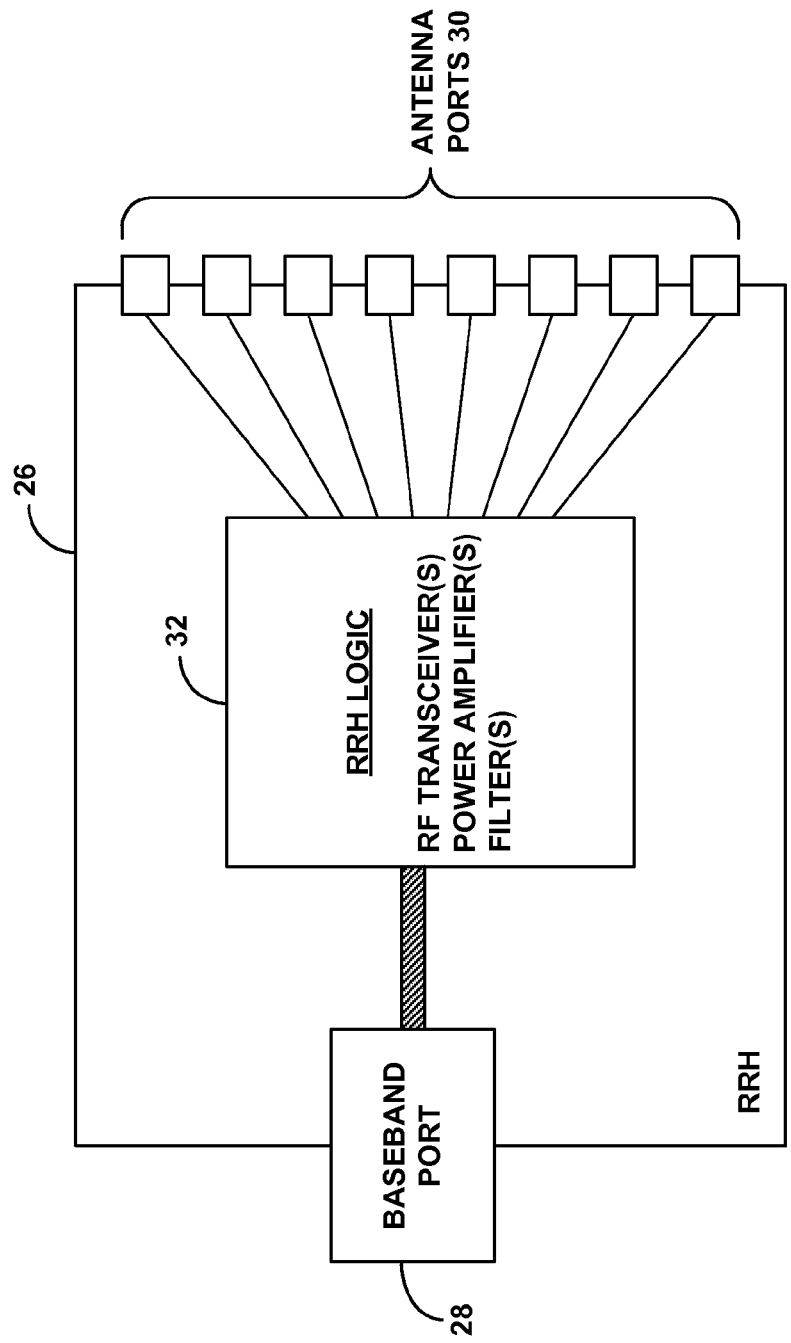
FIG. 3 is a simplified block diagram of an example RRH.

FIG. 3 is next a simplified block diagram of an example RRH 26. As shown, the example RRH includes at least one baseband port 28 for coupling with at least one baseband unit as noted above, and a plurality of antenna ports 30 for coupling with cell site antennas as noted above. In an example arrangement, without limitation, the baseband port could be a multi-fiber-cable port for connecting with a multi-fiber cable that connects in turn with the baseband unit. Further, by way of example, the RRH is shown including eight antenna ports for coupling with cell site antennas, although an example RRH could just as well have a different number of antenna ports. An example RRH such as this may be housed in a unitary housing, which could be configured for mounting on an antenna tower or elsewhere at a cell site.

As additionally shown, the example RRH includes RRH logic 32 comprising one or more components such as RF transceivers, power amplifiers, and filters, cooperatively functioning to carry out various RRH functions for interfacing between a baseband unit and one or more cell site antennas. In a representative arrangement, for instance, for downlink operation, the RRH logic may include an RF transceiver block that receives symbols from a baseband unit channel card and applies an oscillator to modulate a corresponding carrier for the applicable sector. In turn, the RRH logic may then include one or more power amplifiers to amplify the modulated carrier, and one or more filters to help restrict transmission to the desired carrier bandwidth. And the output of the RRH filters may then pass to one or more appropriate antenna ports for output by appropriate cell site antennas. In practice, the RF transceiver and/or other components of the RRH could include a field programmable gate array (FPGA) that can be programmed to provide a desired RRH configuration such as one of those noted above.

Figure 4:
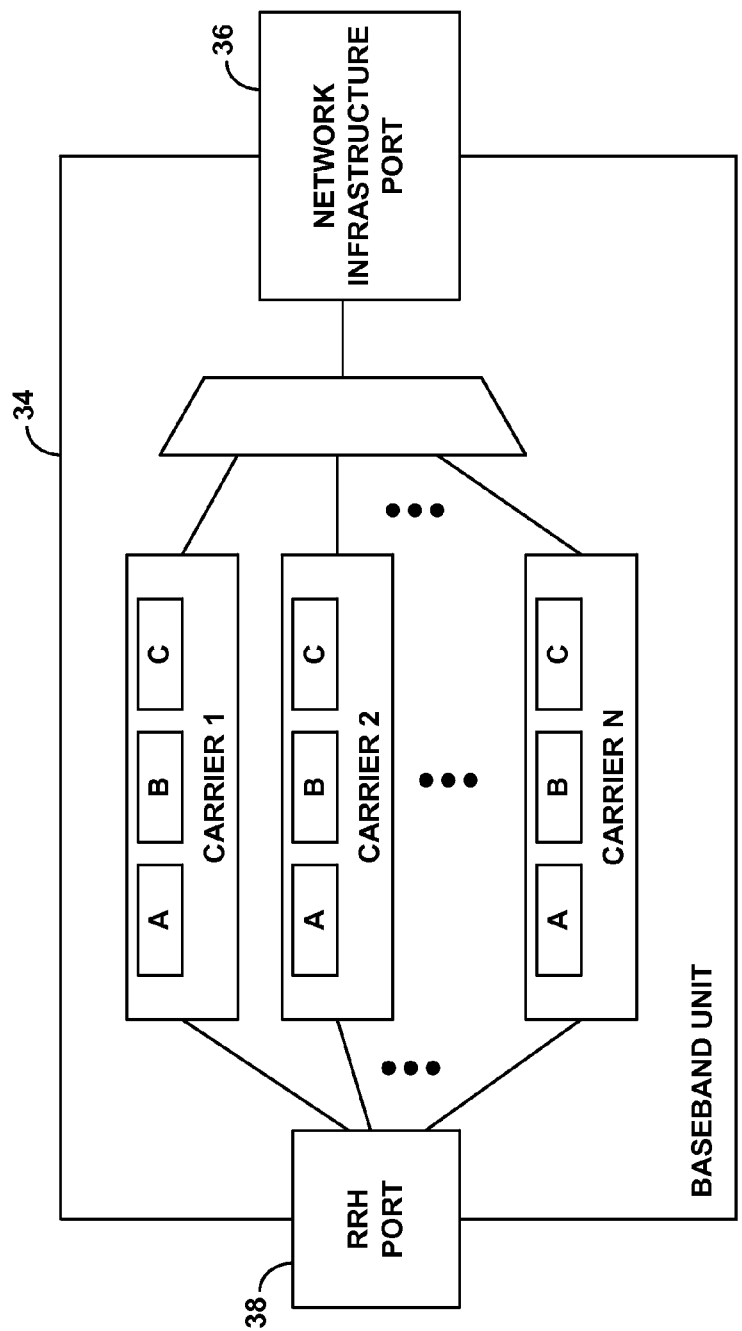
FIG. 4 is a simplified block diagram of an example baseband unit.

FIG. 4 is next a simplified block diagram of an example baseband unit 34. As shown, the example baseband unit includes a network infrastructure port 36 for coupling with network infrastructure as noted above, and an RRH port 38 for coupling with an RRH as noted above. Further, the baseband unit holds a number N of channel cards, each configured in the example arrangement to provide service for a three-sector cell site on a respective carrier. In particular, the cell site at issue is assumed to define three sectors A, B, and C, and a first channel card provides service on carrier 1 for those sectors, a second channel card provides service on carrier 2 for those sectors, and an Nth channel card provides service on carrier N for those sectors. In practice, each channel card could have separate logic modules for carrying out baseband unit functions such encoding/decoding on a per sector basis.

Baseband unit 34 and its channel cards may have an associated base station identifier and network address, so that the network infrastructure 16 can route data to the baseband unit for transmission in the baseband unit's cell site. As data arrives at the baseband unit, the baseband unit may pass the data to an appropriate channel card, and the channel card may encode the data and output the encoded data for transmission in an appropriate sector of the cell site, and vice versa. In practice, the RRH port 38 of the baseband unit may be couple the baseband port 28 of the RRH by a cable encasing multiple fiber optic cables (e.g., common public radio interface (CPRI) cables), such as one per carrier per sector. For instance, sector A from the first channel card (carrier 1) could be coupled by a first fiber optic cable with a connection at the RRH, so that the RRH can handle such communications on carrier 1 for sector A, and similarly for other carriers and sectors.

Figure 5:
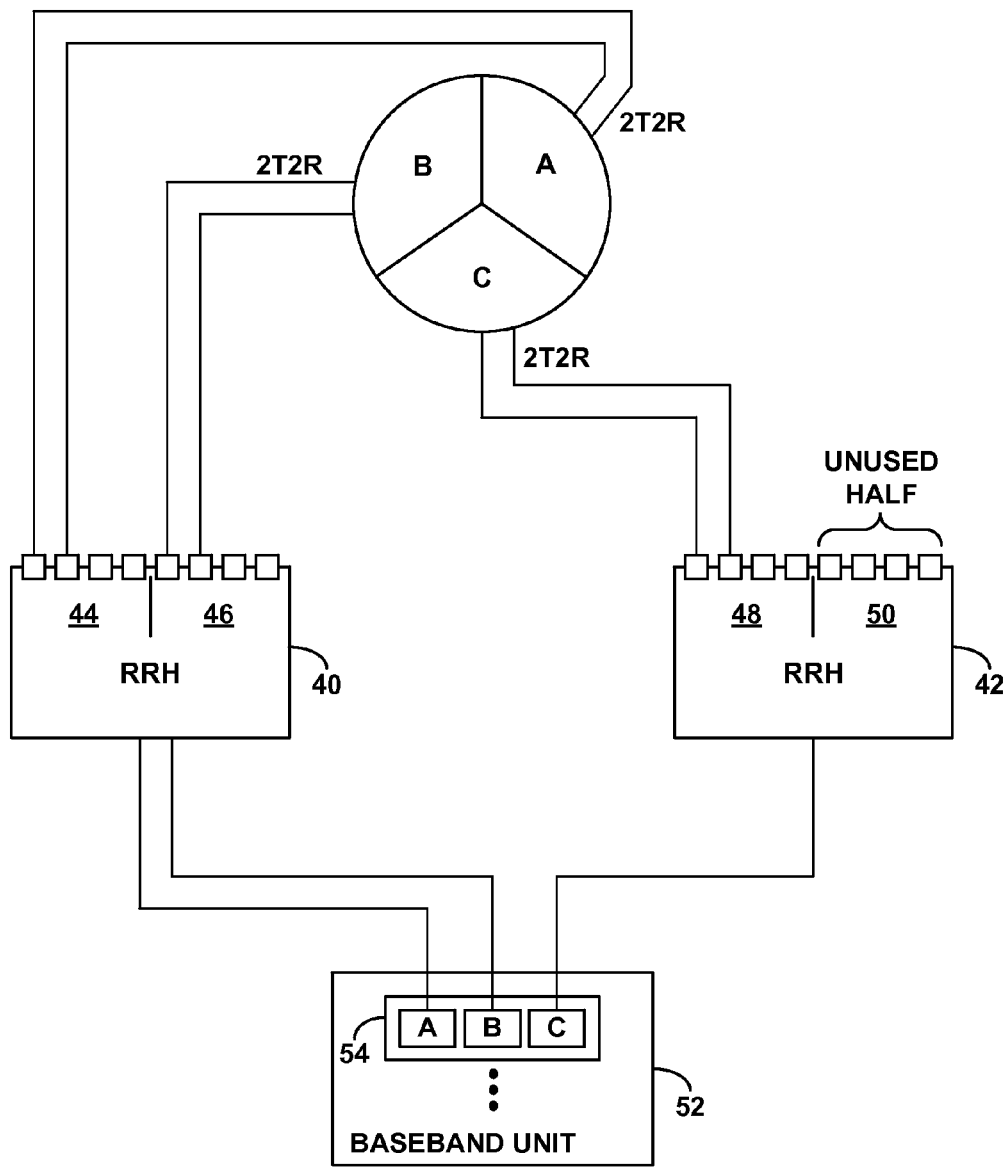
FIG. 5 is a diagram depicting an example cell site arrangement.

FIG. 5 is next a diagram depicting an example cell site arrangement for serving an example three-sector cell site, where each sector provides 2T2R MIMO service. This example arrangement makes use of two eight-port RRHs 40, 42, each logically split (e.g., through FPGA programming) into two four-port halves, with two antenna ports of each half serving a respective sector of the cell site. In particular, RRH 40 is logically split into two four-port halves 44, 46, and RRH 42 is logically split into two four-port halves 48, 50. Of each of three of these four-port halves, two ports are then coupled with the antennas of a respective sector of the cell site. In particular, two ports of RRH half 44 are connected with the antennas of sector A, two ports of RRH half 46 are connected with the antennas of sector B, and two ports of RRH half 48 are connected with the antennas of sector C.

The example cell site arrangement then includes a baseband unit 52 containing an example channel card 54 with logic to serve the three sectors A, B, and C. Thus, with this arrangement, the channel card communication for sector A is coupled with RRH 40, and RRH half 44 interfaces that communication with the antennas of sector A. Likewise, the channel card communication for sector B is coupled with RRH 40, and RRH half 46 interfaces that communication with the antennas of sector B. And the channel card communication for sector C is coupled with RRH 42, and RRH half 48 interfaces that communication with the antennas of sector C.

As is evident in this arrangement, RRH half 50 of RRH 42 goes unused. As noted above, this is an inefficient use of RRH resources.

As noted above, the present disclosure provides for sharing an RRH among multiple cell sites, which could help improve efficiency. Per the disclosure, an RRH will be coupled with at least one or more antennas of a first cell site and one or more antennas of a second, separately located cell site. And the RRH will then function to interface both between one or more baseband units and the first cell site and between one or more baseband units and the second cell site. Such an RRH can include any number of multiple antenna ports and internal logic and could be logically split into multiple RRH parts, each of which could then be configured to serve at least a portion of a separate cell site.

Figure 6:
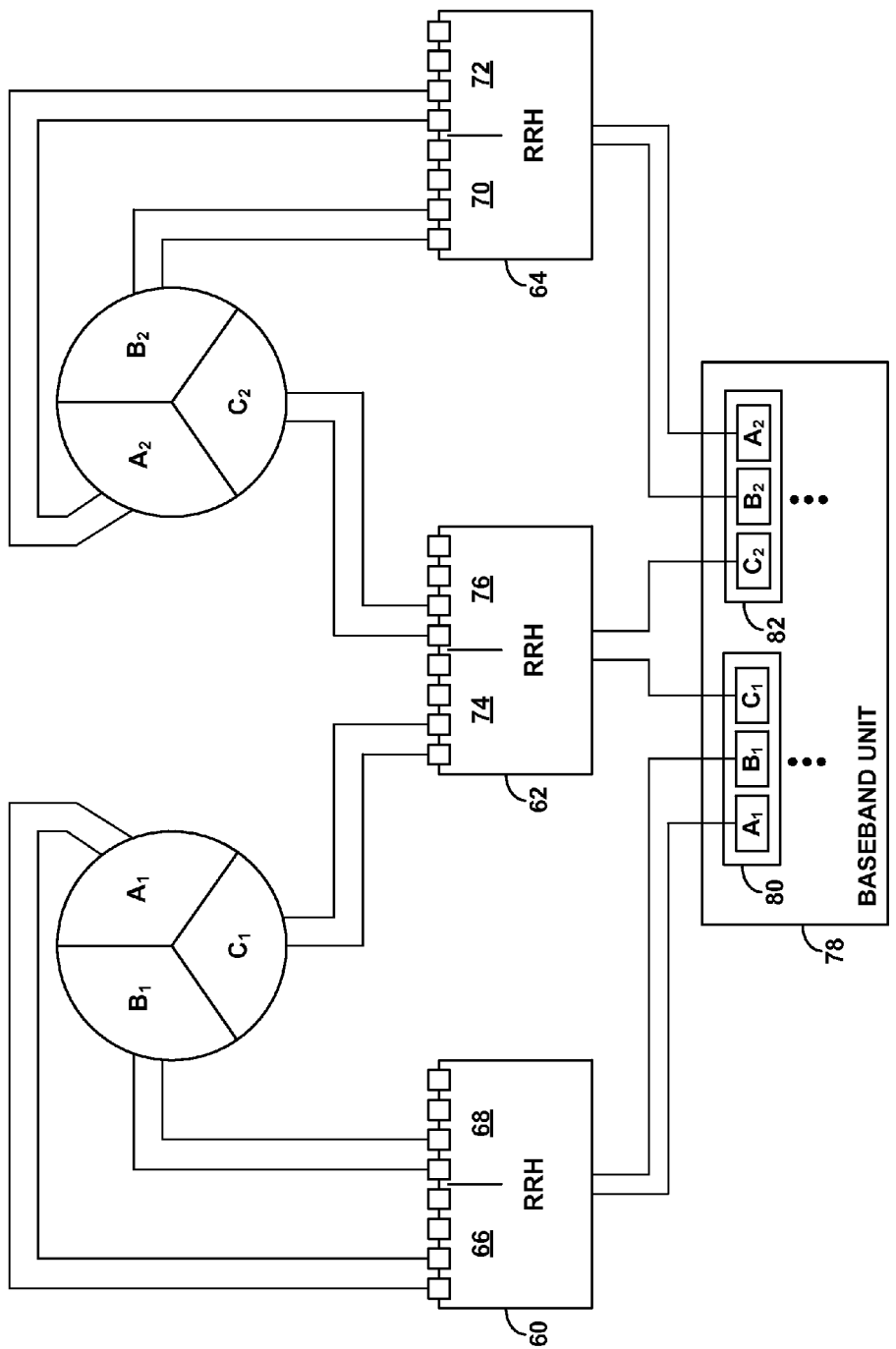
FIG. 6 is a diagram depicting an example arrangement including an RRH shared between cell sites.

FIG. 6 illustrates an example of this improvement, as a variation from the arrangement shown in FIG. 5. In particular, FIG. 6 depicts two separately located three-sector 2T2R cell sites, one cell site having sectors $A_1$, $B_1$, and $C_1$, and the other having sectors $A_2$, $B_2$, and $C_2$. Applying the arrangement of FIG. 5 for these two cell sites would require four RRHs, with two RRHs serving each cell site, and with half of an RRH going unused at each cell site. The arrangement of FIG. 6, however, makes use of just three RRHs 60, 62, 64, as a representative RRH 62 is shared between the two cell sites.

In particular, as shown, RRH 60 is logically split into two halves 66, 68 connected respectively with antennas of sectors $A_1$ and $B_1$ at the first cell site, and RRH 64 is logically split into two halves 70, 72 connected respectively with antennas of sectors $A_2$ and $B_2$ at the second cell site. RRH 62 is then similarly logically split into two halves 74, 76. However, RRH half 74 is connected with antennas of sector $C_1$ at the first cell site, while RRH half 76 is connected with antennas of sector $C_2$ at the second cell site.

FIG. 6 then further illustrates a baseband unit 78 that is also shared between the two cell sites. To facilitate sharing the baseband unit between the multiple cell sites, the baseband unit may have two separate base station identifiers, such as one per channel card, and perhaps two separate network addresses (or perhaps one network address used for both cell sites, with separate transport ports used for each cell site, to facilitate appropriate handling of traffic at the baseband unit).

The baseband unit 78 is shown holding two example channel cards 80, 82 (which could serve the same or different carriers than each other), with channel card 80 serving sectors $A_1$, $B_1$, and $C_1$ of the first cell site and channel card 82 serving sectors $A_2$, $B_2$, and $C_2$ of the second cell site. To facilitate this arrangement, communications of channel card 80 for sectors $A_1$ and $B_1$ are coupled with RRH 60 for interfacing with sectors $A_1$ and $B_1$, communications of channel card 80 for sector $C_1$ are coupled with RRH 62 for interfacing with sector $C_1$, communications of channel card 82 for sectors $A_2$ and $B_2$ are coupled with RRH 64 for interfacing with sectors $A_2$ and $B_2$, and communications of channel card 80 for sector $C_2$ are coupled with RRH 62 for interfacing with sector $C_2$. Advantageously with this arrangement, both halves of RRH 62 are used, one for the first cell site and the other for the other cell site.

In practice, the shared RRH 62 in this arrangement could be positioned at one of the two cell sites, and its antenna ports for serving the other cell site could be coupled with the antennas of the other cell site by an RF-transmission cable such as a coaxial cable (perhaps with added power amplification to account for path loss). Alternatively, the shared RRH 62 could be co-located with the baseband unit 78. Further, all three RRHs 60, 62, 64 could be co-located with each other and perhaps with the baseband unit. Still further, it is possible that multiple baseband units could be provided instead, perhaps with a baseband unit for the first cell site being coupled with RRHs 60 and 62 and a baseband unit for the second cell site being coupled with RRHs 62 and 64. Thus, the shared RRH could be coupled with and interface between one or more baseband units and multiple cell sites. Other arrangements are possible as well.

With this example arrangement, a first proper subset of the antenna ports of shared RRH 62 is connected with at least one of the antennas of the first cell site, and a second proper subset of the antenna ports of the shared RRH is connected with at least one of the antennas of the second cell site, the first and second proper subsets likely being mutually exclusive. The shared RRH may then (i) exchange with the at least one baseband unit (e.g., a given baseband unit) first downlink communications for the first cell site and first uplink communications for the first cell site and (ii) exchange with the at least one baseband unit (e.g., a given baseband unit) second downlink communications for the second cell site and second uplink communications for the second cell site. In particular, the shared RRH may (i) exchange with one or more first site antennas modulated versions of the first downlink communications and modulated versions of the first uplink communications and (ii) exchange with one or more second site antennas modulated versions of the second downlink communications and modulated versions of the second uplink communications.

In practice, for instance, the RRH may receive via the at least one baseband port the first downlink communications from the at least one baseband unit, modulate the received first downlink communications to produce modulated first downlink communications, and transmit via the first proper subset of the antenna ports to the first site antenna(s) the modulated first downlink communications for transmission in the first coverage area. Further, the RRH may receive via the first proper subset of the antenna ports modulated first uplink communications from the first site antenna(s), demodulate the received modulated first uplink communications to produce demodulated first uplink communications, and transmit via the at least one baseband port to the at least one baseband unit the demodulated first uplink communications.

Likewise, the RRH may receive via the at least one baseband port the second downlink communications from the at least one baseband unit, modulate the received second downlink communications to produce modulated second downlink communications, and transmit via the second proper subset of the antenna ports to the second site antenna(s) the modulated second downlink communications for transmission in the second coverage area. And the RRH may receive via the second proper subset of the antenna ports modulated second uplink communications from the second site antenna(s), demodulate the received modulated second uplink communications to produce demodulated second uplink communications, and transmit via the at least one baseband port to the at least one baseband unit the demodulated second uplink communications.

In line with the discussion above, the first wireless coverage area could be one of multiple wireless coverage areas provided by the first cell site, and the second wireless coverage area could be one of multiple wireless coverage areas provided by the second cell site. Further, the at least one baseband unit could be a single baseband unit and could hold one or more channel cards respectively for each cell site (perhaps one for each of multiple respective carriers for the cell site), including at least a first channel card that serves at least the first wireless coverage area of the first cell site and at least a second channel card that serves the second wireless coverage area of the second cell site. With this arrangement, the RRH could be coupled via the at least one baseband port with the first channel card of the baseband unit and could (i) receives from the first channel card the first downlink communications and (ii) send to the first channel card the first demodulated uplink communications. Further, the RRH could be coupled via the at least one baseband port with the second channel card of the baseband unit and could (i) receive from the second channel card the second downlink communications and (ii) send to the second channel card the second demodulated uplink communications.

In addition, in line with the discussion above, while the shared RRH 62 serves both example cell sites, the other RRHs 60 and 64 each interface between the baseband unit and each of at least two wireless coverage areas of one of the cell sites other than the coverage areas served by the shared RRH 62.

Figure 7:
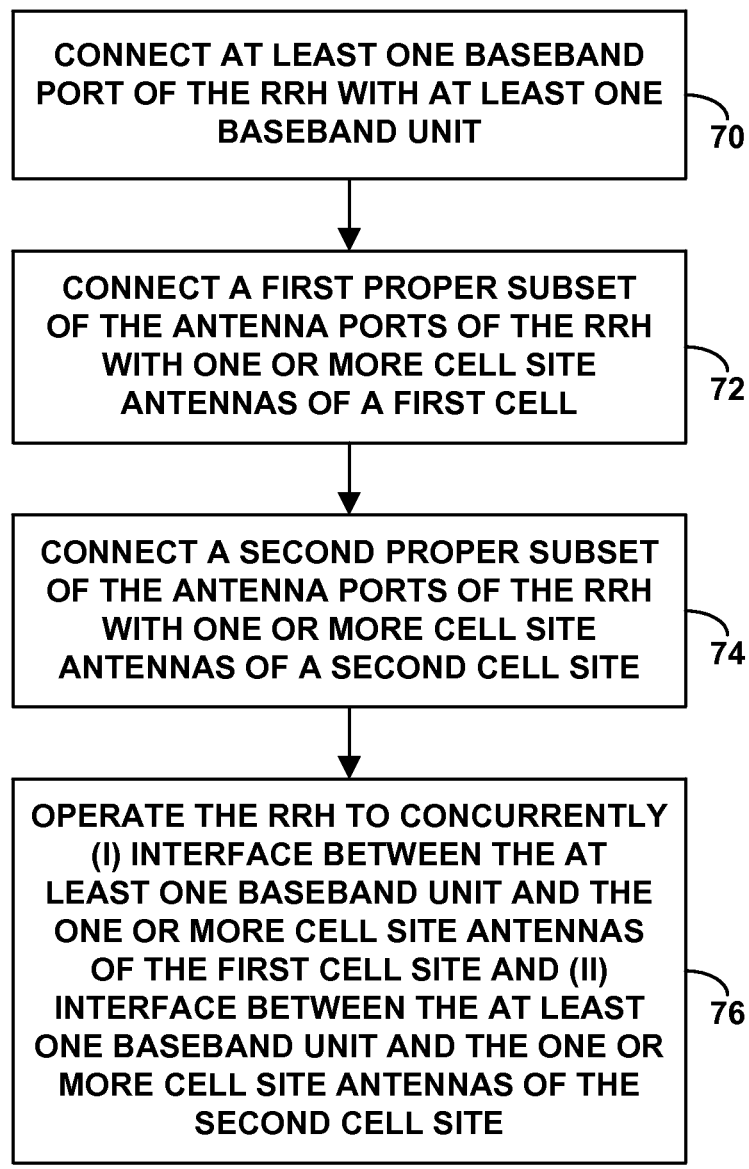
FIG. 7 is a flow chart depicting operations that can be implemented in accordance with the present disclosure.

FIG. 7 is next a flow chart depicting operations that can be carried out in accordance with an example implementation of the present disclosure, to facilitate sharing an RRH between two or more separately located cell sites including a first cell site and a separately located second cell site. The example RRH in this method includes at least one baseband port for coupling the RRH with at least one baseband unit, and the RRH comprises multiple antenna ports for coupling the RRH with cell site antennas. Further, the RRH is configured to receive downlink communications from the at least one baseband unit, modulate the received downlink communications to produce modulated downlink communications, and pass the modulated downlink communications to cell site antennas for wireless transmission, and the RRH is configured to receive modulated uplink communications from cell site antennas, demodulate the received modulated uplink communications to produce demodulated uplink communications, and pass the demodulated uplink communications to the at least one baseband unit for processing.

As shown in FIG. 7, at block 70, the method includes connecting the at least one baseband port of the RRH with the at least one baseband unit (perhaps with a multi-fiber cable). Further, at block 72, the method includes connecting a first proper subset of the antenna ports of the RRH with one or more cell site antennas of the first cell site (e.g., with RF-transmission cables). And at block 74, the method includes connecting a second proper subset of the antenna ports of the RRH with one or more cell site antennas of the second cell site (e.g. with RF-transmission cables), the first and second proper subsets being mutually exclusive. After making these connections (in any order), at block 76, the method then involves operating the RRH to concurrently (i) interface between the at least one baseband unit and the one or more cell site antennas of the first cell site and (ii)

interface between the at least one baseband unit and the one or more cell site antennas of the second cell site.

In line with the discussion above, the act of operating the RRH to interface between the at least one baseband unit and the one or more cell site antennas of the first cell site could involve operating the RRH (i) to receive via the at least one baseband port from the at least one baseband unit first downlink communications for transmission by the first cell site, to modulate the received first downlink communications to produce modulated first downlink communications and to send the modulated first downlink communications via the first proper subset of antenna ports to the one or more cell site antennas of the first cell site, and (ii) to receive via the first proper subset of antenna ports from the one or more cell site antennas of the first cell site modulated first uplink communications, to demodulate the modulated first uplink communications to produce demodulated first uplink communications, and to send the demodulated first uplink communications via the at least one baseband port to the at least one baseband unit for processing.

Further, the act of operating the RRH to interface between the at least one baseband unit and the one or more cell site antennas of the second cell site could comprise operating the RRH (i) to receive via the at least one baseband port from the baseband unit second downlink communications for transmission by the second cell site, to modulate the received second downlink communications to produce modulated second downlink communications and to send the modulated second downlink communications via the second proper subset of antenna ports to the one or more cell site antennas of the second cell site, and (ii) to receive via the second proper subset of antenna ports from the one or more cell site antennas of the second cell site modulated second uplink communications, to demodulate the modulated second uplink communications to produce demodulated second uplink communications, and to send the demodulated second uplink communications via the at least one baseband port to the at least one baseband unit for processing.

In this method, the first cell site may be configured with separate first antennas for providing respective first sectors of the first cell site, the second cell site may be configured with separate second antennas for providing respective second sectors of the second cell site, and the at least one baseband unit may hold one or more channel cards, each channel card being for the sectors of a respective one of the cell sites. The act of connecting the at least one baseband port of the RRH with the at least one baseband unit may then comprise (i) connecting the at least one baseband port of the RRH with a first one of the channel cards, to facilitate the RRH interfacing between the first channel card and a first sector of the first cell site, and (ii) connecting the at least one baseband port of the RRH with a second one of the channel cards, to facilitate the RRH interfacing between the second channel card and a second sector of the second cell site. Further, as noted above, the method may involve co-locating the RRH with the at least one baseband unit.

Exemplary embodiments have been described above. Those skilled in the art will understand, however, that changes and modifications may be made to these embodiments without departing from the true scope and spirit of the invention.

We claim:

1. A wireless communication system with a shared radio-head, the system comprising:
   at least two cell sites located at different positions than each other, each cell site including respectively one or more antennas configured to provide at least one respective wireless coverage area, wherein a first cell site includes one or more first site antennas configured to provide at least a first wireless coverage area, and a second cell site includes one or more second site antennas configured to provide at least a second wireless coverage area; and
   a remote radio head (RRH) arranged to serve at least the two cell sites concurrently, wherein the RRH includes at least one baseband port for coupling with at least one baseband unit and includes multiple antenna ports for coupling with (a) at least one of the one or more first site antennas and (b) at least one of the one or more second site antennas,
   wherein the RRH interfaces between the at least one baseband unit and the at least one of the one or more first site antennas and interfaces between the at least one baseband unit and the at least one of the one or more second site antennas.

2. The wireless communication system of claim 1, wherein the at least one baseband port is connected with the at least one baseband unit, wherein the RRH (i) exchanges with the at least one baseband unit first downlink communications for the first cell site and first uplink communications for the first cell site and (ii) exchanges with the at least one baseband unit second downlink communications for the second cell site and second uplink communications for the second cell site.

3. The wireless communication system of claim 2, wherein a first proper subset of the antenna ports is connected with at least one of the one or more first site antennas and a second proper subset of the antenna ports is connected with at least one of the one or more second site antennas, the first and second proper subsets being mutually exclusive, and
wherein the RRH (i) exchanges with the at least one of the one or more first site antennas modulated versions of the first downlink communications and modulated versions of the first uplink communications and (ii) exchanges with the at least one of the one or more second site antennas modulated versions of the second downlink communications and modulated versions of the second uplink communications.

4. The wireless communication system of claim 3, wherein the RRH receives via the at least one baseband port the first downlink communications from the at least one baseband unit, modulates the received first downlink communications to produce modulated first downlink communications, and transmits via the first proper subset of the antenna ports to the at least one of the one or more first site antennas the modulated first downlink communications for transmission in the first wireless coverage area,
wherein the RRH receives via the first proper subset of the antenna ports modulated first uplink communications from the at least one of the one or more first site antennas, demodulates the received modulated first uplink communications to produce demodulated first uplink communications, and transmits via the at least one baseband port to the at least one baseband unit the demodulated first uplink communications,
wherein the RRH receives via the at least one baseband port the second downlink communications from the at least one baseband unit, modulates the received second downlink communications to produce modulated second downlink communications, and transmits via the second proper subset of the antenna ports to the at least one of the one or more second site antennas the modulated second downlink communications for transmission in the second wireless coverage area, and wherein the RRH receives via the second proper subset of the antenna ports modulated second uplink communications from the at least one of the one or more second site antennas, demodulates the received modulated second uplink communications to produce demodulated second uplink communications, and transmits via the at least one baseband port to the at least one baseband unit the demodulated second uplink communications.

5. The wireless communication system of claim 4, wherein the first wireless coverage area is one of multiple wireless coverage areas provided by the first cell site, and the second wireless coverage area is one of multiple wireless coverage areas provided by the second cell site, wherein the at least one baseband unit is a single baseband unit and holds one or more channel cards respectively for each cell site, including at least a first channel card for the first wireless coverage area and at least a second channel card for the second wireless coverage area, wherein the RRH is coupled via the at least one baseband port with the first channel card of the baseband unit and (i) receives from the first channel card the first downlink communications and (ii) sends to the first channel card the first demodulated uplink communications, and wherein the RRH is coupled via the at least one baseband port with the second channel card of the baseband unit and (i) receives from the second channel card the second downlink communications and (ii) sends to the second channel card the second demodulated uplink communications.

6. The wireless communication system of claim 5, wherein the baseband unit holds multiple channel cards respectively for each cell site, wherein each channel card for a cell site serves communications on a respective carrier for the cell site.

7. The wireless communication system of claim 5, wherein the RRH is a first RRH, wherein the system further comprises a second RRH and a third RRH, and wherein the second RRH interfaces between the baseband unit and each of at least two wireless coverage areas of the first cell site other than the first wireless coverage area, and the third RRH interfaces between the baseband unit and each of at least two wireless coverage areas of the second cell site other than the second wireless coverage area.

8. The wireless communication system of claim 5, wherein the RRH is connected by at least one multi-fiber cable with the baseband unit, wherein the RRH is connected by at least one coaxial cable with the at least one of the one or more first site antennas, and wherein the RRH is connected by at least one coaxial cable with the at least one of the one or more second site antennas.

9. The wireless communication system of claim 1, wherein the RRH is co-located with the at least one baseband unit.

10. The wireless communication system of claim 1, wherein the RRH is positioned at one of the first cell site or second cell site.

11. A method for sharing a remote radio head (RRH) between two or more separately located cell sites including a first cell site and a separately located second cell site, wherein the RRH comprises at least one baseband port for coupling the RRH with at least one baseband unit, and the RRH comprises multiple antenna ports for coupling the RRH with cell site antennas, and (i) the RRH is configured to receive downlink communications from the at least one baseband unit, modulate the received downlink communications to produce modulated downlink communications, and pass the modulated downlink communications to cell site antennas for wireless transmission, and (ii) the RRH is configured to receive modulated uplink communications from cell site antennas, demodulate the received modulated uplink communications to produce demodulated uplink communications, and pass the demodulated uplink communications to the at least one baseband unit for processing, the method comprising:

connecting the at least one baseband port of the RRH with the at least one baseband unit;

connecting a first proper subset of the antenna ports of the RRH with one or more cell site antennas of the first cell site;

connecting a second proper subset of the antenna ports of the RRH with one or more cell site antennas of the second cell site, the first and second proper subsets being mutually exclusive; and operating the RRH to concurrently (i) interface between the at least one baseband unit and the one or more cell site antennas of the first cell site and (ii) interface between the at least one baseband unit and the one or more cell site antennas of the second cell site.

12. The method of claim 11, wherein operating the RRH to interface between the at least one baseband unit and the one or more cell site antennas of the first cell site comprises operating the RRH (i) to receive via the at least one baseband port from the at least one baseband unit first downlink communications for transmission by the first cell site, to modulate the received first downlink communications to produce modulated first downlink communications and to send the modulated first downlink communications via the first proper subset of antenna ports to the one or more cell site antennas of the first cell site, and (ii) to receive via the first proper subset of antenna ports from the one or more cell site antennas of the first cell site modulated first uplink communications, to demodulate the modulated first uplink communications to produce demodulated first uplink communications, and to send the demodulated first uplink communications via the at least one baseband port to the at least one baseband unit for processing, and wherein operating the RRH to interface between the at least one baseband unit and the one or more cell site antennas of the second cell site comprises operating the RRH (i) to receive via the at least one baseband port from the baseband unit second downlink communications for transmission by the second cell site, to modulate the received second downlink communications to produce modulated second downlink communications and to send the modulated second downlink communications via the second proper subset of antenna ports to the one or more cell site antennas of the second cell site, and (ii) to receive via the second proper subset of antenna ports from the one or more cell site antennas of the second cell site modulated second uplink communications, to demodulate the modulated second uplink communications to produce demodulated second uplink communications, and to send the demodulated second uplink communications via the at least one baseband port to the at least one baseband unit for processing.

13. The method of claim 11,
wherein the first cell site is configured with separate first antennas for providing respective first sectors of the first cell site, and the second cell site is configured with separate second antennas for providing respective second sectors of the second cell site,
wherein the at least one baseband unit holds one or more channel cards, each channel card being for the sectors of a respective one of the cell sites, and
wherein connecting the at least one baseband port of the RRH with the at least one baseband unit comprises (i) connecting the at least one baseband port of the RRH with a first one of the channel cards, to facilitate the RRH interfacing between the first channel card and a first sector of the first cell site, and (ii) connecting the at least one baseband port of the RRH with a second one of the channel cards, to facilitate the RRH interfacing between the second channel card and a second sector of the second cell site.

14. The method of claim 11,
wherein connecting the at least one baseband port of the RRH with the at least one baseband unit is done with at least one multi-fiber cable,
wherein connecting the first proper subset of the antenna ports of the RRH with one or more cell site antennas of the first cell site is done with at least a first coaxial cable, and
wherein connecting the second proper subset of the antenna ports of the RRH with one or more cell site antennas of the second cell site is done with at least a second coaxial cable.

15. The method of claim 11, further comprising co-locating the RRH with the at least one baseband unit.

16. A remote radio head (RRH) configuration for concurrently serving two separately located cell sites, including a first cell site and a separately located second cell site, wherein the RRH configuration comprises:
an RRH having at least one baseband port for coupling with at least one baseband unit, and having a plurality of antenna ports for coupling with cell site antennas, the RRH being configured to (i) receive downlink communications from the at least one baseband unit, modulate the received downlink communications to produce modulated downlink communications, and pass the modulated downlink communications to cell site antennas for wireless transmission, and (ii) receive modulated uplink communications from cell site antennas, demodulate the received modulated uplink communications to produce demodulated uplink communications, and pass the demodulated uplink communications to the at least one baseband unit for processing,
wherein the at least one baseband port of the RRH is coupled with the at least one baseband unit,
wherein a first proper subset of the antenna ports of the RRH is coupled with one or more cell site antennas of the first cell site,
wherein a second proper subset of the antenna ports of the RRH is coupled with one or more cell site antennas of the second cell site, the first and second proper subsets being mutually exclusive, and
wherein the RRH is configured to concurrently (i) interface between the at least one baseband unit and the one or more cell site antennas of the first cell site and (ii) interface between the at least one baseband unit and the one or more cell site antennas of the second cell site.

17. The RRH configuration of claim 16,
wherein the RRH interfacing between the at least one baseband unit and the one or more cell site antennas of the first cell site comprises the RRH (i) receiving via the at least one baseband port from the at least one baseband unit first downlink communications for transmission by the first cell site, modulating the received first downlink communications to produce modulated first downlink communications and sending the modulated first downlink communications via the first proper subset of antenna ports to the one or more cell site antennas of the first cell site, and (ii) receiving via the first proper subset of antenna ports from the one or more cell site antennas of the first cell site modulated first uplink communications, demodulating the modulated first uplink communications to produce demodulated first uplink communications, and sending the demodulated first uplink communications via the at least one baseband port to the at least one baseband unit for processing, and
wherein the RRH interfacing between the at least one baseband unit and the one or more cell site antennas of the second cell site comprises the RRH (i) receiving via the at least one baseband port from the baseband unit second downlink communications for transmission by the second cell site, modulating the received second downlink communications to produce modulated second downlink communications and sending the modulated second downlink communications via the second proper subset of antenna ports to the one or more cell site antennas of the second cell site, and (ii) receiving via the second proper subset of antenna ports from the one or more cell site antennas of the second cell site modulated second uplink communications, demodulating the modulated second uplink communications to produce demodulated second uplink communications, and sending the demodulated second uplink communications via the at least one baseband port to the at least one baseband unit for processing.

18. The RRH configuration of claim 16,
wherein the first cell site is configured with separate first antennas for providing respective first sectors of the first cell site, and the second cell site is configured with separate second antennas for providing respective second sectors of the second cell site,
wherein the at least one baseband unit holds one or more channel cards, each channel card being for the sectors of a respective one of the cell sites, and
wherein (i) the at least one baseband port of the RRH is connected with a first one of the channel cards, to facilitate the RRH interfacing between the first channel card and a first sector of the first cell site, and (ii) the at least one baseband port of the RRH is connected with a second one of the channel cards, to facilitate the RRH interfacing between the second channel card and a second sector of the second cell site.

19. The RRH configuration of claim 16,
wherein the at least one baseband port of the RRH is connected by at least one multi-fiber cable with the at least one baseband unit,
wherein the first proper subset of the antenna ports of the RRH is connected by at least one coaxial cable with the one or more cell site antennas of the first cell site, and wherein the second proper subset of the antenna ports of the RRH is connected by at least one coaxial cable with the one or more cell site antennas of the second cell site.

20. The RRH configuration of claim 16, wherein the RRH is co-located with the at least one baseband unit.

* * * * *